United States Patent [19]

Nakagawa

[11] Patent Number: 5,236,528
[45] Date of Patent: Aug. 17, 1993

[54] METHOD FOR PRODUCING A FRICTION MEMBER ESPECIALLY FOR A BRAKE

[75] Inventor: Mitsuhiko Nakagawa, Hyogo, Japan

[73] Assignee: Sumitomo Electric Industries, Ltd., Osaka, Japan

[21] Appl. No.: 774,575

[22] Filed: Oct. 10, 1991

Related U.S. Application Data

[62] Division of Ser. No. 575,496, Aug. 30, 1990, abandoned.

[30] Foreign Application Priority Data

Sep. 1, 1989 [JP] Japan .................................. 1-103315

[51] Int. Cl.$^5$ .......................... F16D 13/60; B32B 31/00
[52] U.S. Cl. ...................................... 156/153; 156/281; 156/283; 156/314; 156/322; 188/73.1; 192/107 M
[58] Field of Search ............... 156/153, 310, 314, 245, 156/281, 283, 306.6, 322; 188/251 A, 73.1, 73.45, 251 R, 250 G; 419/8; 192/107 M

[56] References Cited

U.S. PATENT DOCUMENTS

| | | |
|---|---|---|
| 3,162,271 | 12/1964 | Hanson .............................. 188/73.1 |
| 3,520,747 | 7/1970 | McGaughey ........................ 156/153 |
| 4,585,104 | 4/1986 | Komatsu .................... 192/107 M X |
| 4,778,548 | 10/1988 | Fox et al. ............................ 156/153 |
| 4,835,013 | 5/1989 | Heck et al. ......................... 427/295 |

FOREIGN PATENT DOCUMENTS

| | | |
|---|---|---|
| 0016682 | 10/1980 | European Pat. Off. ........... 188/73.1 |
| 51-24533 | 2/1976 | Japan . |
| 55-155935 | 12/1980 | Japan .................................. 188/73.1 |
| 56-55732 | 5/1981 | Japan .................................. 188/73.1 |
| 57-45939 | 9/1982 | Japan . |
| 59-144836 | 8/1984 | Japan . |
| 60-69336 | 4/1985 | Japan .............................. 192/107 M |

Primary Examiner—Jeff H. Aftergut
Attorney, Agent, or Firm—W. G. Fasse; D. H. Kane, Jr.

[57] ABSTRACT

A friction member has an improved anticorrosiveness and an improved shearing strength. For this purpose, the friction member includes a cured organic film (2) formed on a surface of a backing plate (1) and sandwiched between an adhesive layer (3) on a friction material (4) and the backing plate. The film (2) has a thickness sufficient to protect the backing plate (1) against corrosion. The organic film (2) is not affected by heat and/or pressure during the bond forming molding of the backing plate (1) and the friction material (4), so that the anticorrosiveness and the shearing strength of the friction member is improved.

6 Claims, 2 Drawing Sheets

METHOD FOR PRODUCING A FRICTION MEMBER ESPECIALLY FOR A BRAKE

CROSS-REFERENCE TO RELATED APPLICATIONS

This is a DIVISIONAL of U.S. patent application Ser. No.: 07/575,496, filed: Aug. 30, 1990, now abandoned.

FIELD OF THE INVENTION

The present invention relates to a method of producing a friction member. More particularly, the present invention relates to friction members for use in brakes of automobiles and the like.

BACKGROUND INFORMATION

A conventional disc pad for a disc brake is molded by bonding a pad, that is a friction material, to a backing plate. The disc pad is pressed against a rotating disc to control the rotation of the disc through a friction force, thereby stopping an automobile. In this case, the disc pad is subjected to strong forces causing shearing stress and frictional heat. The disc pad is directly exposed to the environment so that the pad is directly affected by wind and rain and such snow melting agents as NaCl and $CaCl_2$. Accordingly, the disc pad is exposed to very severe operating conditions caused by mechanical forces and corrosion.

In spite of these rough operating conditions, normally such brake pads must not accidentally fail for safety's sake. Accordingly, the surfaces of the pad and of the backing plate to be bonded to each other are required to have such a bonding strength that a failure of the bond between the surfaces is avoided.

Therefore, conventionally, the bonding of the pad to the backing plate is mechanically strengthened by roughening the backing plate surface by shot blasting prior to bonding. While this method is effective when the pad is new, the periphery or the spigot hole portion of the backing plate starts rusting during prolonged use or in case of travelling on a road with melting snow including salt. The rust gradually spreads in the bonded surface of the backing plate, resulting in the detachment of the pad from the backing plate or in a reduction of the bonding strength, causing the brake to malfunction which might lead to an accident, if the control over the vehicle is thereby lost.

Therefore, methods of preventing rusting between the backing plate and the pad have been proposed. These methods are disclosed in, for example, Japanese Patent Publication No. 57-45939, Japanese Patent Laying-Open No. 51-24533 and Japanese Patent Laying-Open No.: 59-144836.

Japanese Patent Publication No. 57-45939 discloses a technique of forming a tri-iron tetroxide layer of 0.1-5.0 μm in film thickness on a surface of a backing plate. However, it is not possible by this method to attain any remarkable anticorrosiveness that is required for achieving the necessary reliability of the disc pad.

Japanese Patent Laying-Open No. 51-24533 discloses a technique of improving the anticorrosiveness of the backing plate by subjecting the same to a soft nitriding gas treatment. However, the known method involves a complicated process and it is not possible to achieve a useful cost reduction nor a remarkable anticorrosiveness.

Japanese Patent Laying-Open No. 59-144836 discloses an improvement in the anti-corrosiveness by applying to the surface of the backing plate, a chromic acid treatment with a liquid containing 5 weight % of Zn particles having a particle diameter of 5 μm. However, while thic chromic acid treatment improves the anticorrosiveness, it is difficult to perform the treatment with the chromic acid for safety, hygiene and pollution reasons. Besides, the treatment might cause high manufacturing costs.

As described above, various methods are proposed for preventing rusting between the backing plate and the pad.

However, it is difficult by any of the known methods to achieve such anticorrosiveness that a highly reliable disc pad is obtained and even if such a reliable pad is obtained, there are problems in safety, hygiene, pollution, and manufacturing costs.

A conventional disc pad is integrally molded by bonding a backing plate and a lining to each other by an adhesive, which is extended due to heat and pressure applied during the molding of the friction material, whereby the adhesive is absorbed by the friction material. Thus, it is substantially impossible to specify a thickness of the adhesive layer. Even if the thickness of the adhesive is increased, it is all the same difficult to specify the thickness because of flow of the adhesive before the curing thereof. Accordingly, it is difficult to expect an adhesive to be anticorrosive in a disc pad which is one example of a conventional friction member. In addition, even a conventional disc pad or friction member treated so as to prevent rusting, has an insufficient anticorrosiveness between the backing plate and the pad, whereby it is difficult to maintain the shearing strength of the friction member for a long time.

SUMMARY OF THE INVENTION

It is an object of the present invention to maintain the anticorrosiveness of a friction member for a long time period.

Another object of the present invention is to improve the shearing strength of a friction member.

According to one aspect of the present invention, a friction member includes a friction material for controlling the operation, for example, of a vehicle wheel by utilizing friction, a backing plate to which the friction material is attached by an adhesive layer, and a cured thermosetting organic film formed on the surface of the backing plate, so that the film is positioned between the adhesive layer and the backing plate, said film having a predetermined film thickness.

Since the cured thermosetting film having a predetermined film thickness is formed on the surface of the backing plate, the cured organic film is not affected by heat or pressure during the molding.

The friction member of the present invention, is preferably manufactured by the steps of providing a rough surface on the backing plate as required after the degreasing thereof, coating the rough surface of the backing plate with resin powder which becomes a cured organic film, completing the cured organic film by a heat treatment, drying an adhesive applied on the cured organic film and arranging a friction material on the adhesive and thereafter subjecting the same to a heat treatment.

Since the rough surface of the backing plate is powder coated and since the powder becomes the thermosetting organic film which is cured and thereafter the friction material is bonded by an adhesive to said film, the cured organic film formed on the backing plate is not affected by heat or pressure during the molding.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
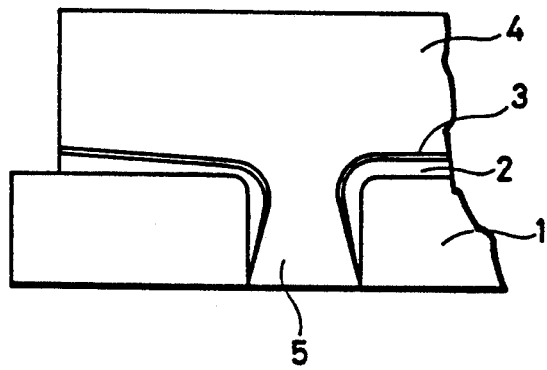
FIG. 1 is a sectional view of a structure of a disc pad showing one embodiment of a friction member according to the present invention.

Referring to FIG. 1, the disc pad comprises a backing plate 1 made of SAPH which is an iron material, an organic film 2 formed on the surface of the backing plate 1 and already cured for anticorrosion, a friction material 4 is bonded to the organic film 2 by an adhesive layer 3 of a phenolic resin provided between the film 2 and the friction material 4. The friction material 4 comprises 30 weight % of steel fiber, 10 weight % of glass fiber, 10 weight % of aramid fiber, 20 weight % of phenolic resin, 10 weight % of barium sulfate, 10 weight % of copper powder and 10 weight % of friction dust. A spigot hole 5 is provided in the backing plate 1 to engage with the friction material 4.

The method of manufacturing the disc pad shown in FIG. 1 will be described with reference to FIG. 2. As shown in the first step 101, after degreasing the backing plate 1 with trichloroethylene, one surface of the plate 1 is roughened by shot blasting. Then, as shown in the second step 102, the rough surface of the backing plate 1 is coated, e.g. by electrostatic spraying, with a resin powder, such as an epoxy powder which becomes the organic film 2. Experimentally, the organic film 2 of a predetermined thickness can be obtained by heating the backing plate to 180° C. and sprinkling the powder resin through a wire net of 100 mesh size. Thereafter, as shown in the second step 103, a heat treatment is performed at 180° C. for one hour to complete the organic film 2. As shown by the fourth step 104, an adhesive comprising a phenolic resin, is applied to the organic film 2 to form the adhesive layer 3, which is dried at a temperature of 80° C. for half an hour. Then, as shown in the fifth step 105, the resulting structure with the thermosetting organic film 2 sandwiched between the backing plate 1 and the adhesive layer 3 is molded with the friction material 4 in a molding die at a temperature of 160° C. Thereafter, the molded structure is subjected to a further heat treatment at a temperature of 200° C. for ten hours to obtain a disc pad. The organic film 2 is not limited to an epoxy resin, but it may be phenol, melamine, acryl, thermosetting resin or rubber-phenolic powder. While a filler or a coloring agent may be added to these organic substances, it is preferable to add nothing thereto.

It is desirable to use the same or similar material as that of the organic film 2 for a material of the adhesive material layer 3. This is so because the usage of the same or similar material allows an improvement in the bonding strength between the organic film 2 and the adhesive layer 3. The considerable anticorrosion effect can be obtained with the organic film 2 having a film thickness of not less than 5 $\mu$m or more, and preferably it is 10 $\mu$m or more, and more preferably 15 $\mu$m or more.

It is also possible to obtain a film similar to the above-described organic film 2 by spraying a resin dissolved in an organic solvent, drying the solvent and thereafter applying heat for curing. With this method, however, the curing rate of the resin is low and numerous defects are caused such as air bubbles and pits in the film when the organic solvent is evaporated in the curing step. The larger the thickness of the film becomes, the more defects are caused such as air bubbles and therefore it is difficult to obtain a film of a large enough thickness without causing defects. In addition, in terms of the working environment, safety, e.g. fire hazard and hygiene, organic solvent poisoning, superfluous resin and solvent scattered by a spray are not desirable.

On the other hand, when using such powder resin without an organic solvent as taught by the present embodiment, the above problems are all avoided. Some powder resin to be used generates such gas as $H_2O$ or ammonium gas due to a condensation reaction during the drying and curing. Although the gas is of negligible volume as compared with the above-described conventionally used solvent, there is a possibility of causing defects, so that it is more preferable to use epoxy resin or bis-malemide triazine resin.

The following Table 1 shows testing results for the shearing strength and the anticorrosiveness of three disc pads according to the present invention and of two conventional disc pads.

TABLE 1

| | Shearing Strength | Non-rusted area (% of total disc area) | Film Thickness |
|---|---|---|---|
| Invention Example 1 | 75 Kg/cm$^2$ | 100% | 30 $\mu$m |
| Invention Example 2 | 73 Kg/cm$^2$ | 95% | 6 $\mu$m |
| Invention Example 3 | 73 Kg/cm$^2$ | 98% | 20 $\mu$m |
| Reference Example 1 | 60 Kg/cm$^2$ | 85% | No film |
| Reference Example 2 | 66 Kg/cm$^2$ | 77% | No film |

Note: The results are based on measurements of 20 measuring cycles of the corrosion bonding test according to JASO C444-78 (Japanese Testing Standards).

Referring to Table 1, in the example 1 of the invention, the thickness of the organic film 2 is 30 $\mu$m. In the example 2 of the invention, the film thickness is 6 $\mu$m. In the example 3 of the invention the film thickness is 11 $\mu$m.

In the reference example 1 the backing plate was made of SAPH and soft nitrided. A phenol resin adhesive was directly applied to the backing plate, which is dried whereby an adhesive film of 20 $\mu$m thickness was formed. A friction member was bonded to the adhesive in a molding process. The reference example 2 also included a backing plate made of SAPH which was degreased with trichloroethylene and a tri-iron tetroxide layer of 4 $\mu$m was formed on the surface of the backing plate. Then the same adhesive bonding of the friction member to the backing plate was performed as for reference example 1.

Table 1 shows that both the shearing strength and the anticorrosiveness are further improved in the examples 1 and 3 of the invention as compared to reference examples 1 and 2. It can be also seen that the anticorrosiveness of examples 1 and 3 of the invention becomes stronger as the film thickness of the organic film 2 becomes larger. As a result of the observation of the cross section of the disc pad of example 1 of the invention, through a microscope, it was found that an organic film 2 of about 25 μm is formed all over. It follows that the organic film is scarcely affected by heat or pressure during the mold bonding with the friction member. On the contrary, no film could be observed having a definite film thickness in either of the reference examples 1 and 2.

As described above, by forming the cured organic film 2 on the surface of the backing plate 1, the disc pad according to the invention FIG. 1 prevents rusting between the backing plate 1 and the friction material 4 by an improved anticorrosiveness achieved by the film 2. In addition, by using the same or a similar material as that of the organic film 2, for the adhesive layer 3, the bonding strength between the organic film 2 and the adhesive layer 3 has been increased, thereby improving the shearing strength of the disc pad.

Figure 2:
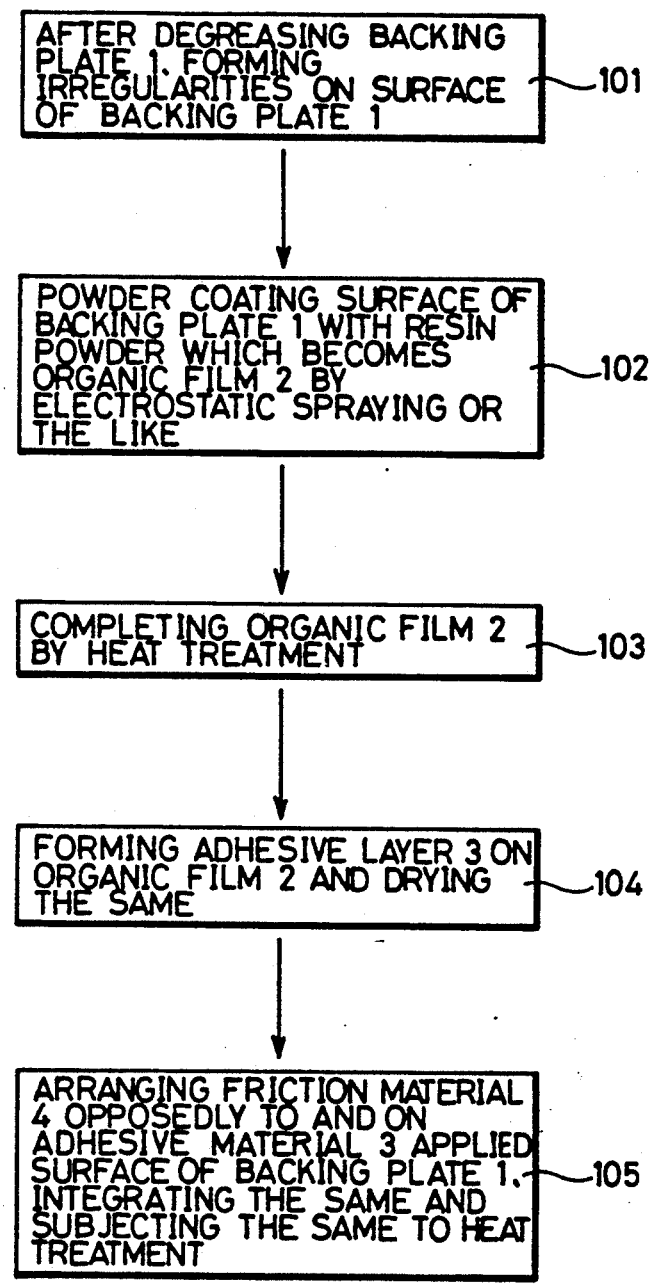
FIG. 2 is a flow diagram explaining a manufacturing process of a disc pad according to one embodiment of the friction member shown in FIG. 1.

Rusting between the backing plate 1 and the friction material 4 has been effectively prevented by the method of manufacturing the disc pad as illustrated in FIG. 2. The adhesive layer 3 and the friction material 4 are bonded to each other by mold bonding after coating the surface of the backing plate 1 with a resin powder, such as epoxy resin by an electrostatic spraying step, and after completing the organic film 2 by a heat treatment.

The main advantage according to the present invention is seen in that the cured thermosetting organic film 2 of a predetermined thickness, is formed on the surface of the backing plate 1, to prevent rusting of the backing plate 1. The thermosetting organic film 2 is not affected by heat or pressure during the bond molding, so that the anticorrosiveness of the friction member has been improved. Furthermore, by using substantially the same material for making the thermosetting organic film 2 and for the adhesive layer 3, the shearing strength of the friction material has been improved.

Another advantage of the present invention is seen in that by powder coating the backing plate with the thermosetting organic material for forming the film 2, and curing and then bonding with the friction material by mold bonding, the so formed thermosetting organic film formed on the backing plate 1 is not affected by heat or pressure during the molding, anticorrosiveness of the friction member has been improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a friction member by adhesively bonding a friction pad to a surface of a backing plate, comprising the following steps:
   (a) degreasing said surface of said backing plate to form a degreased surface and roughening said degreased surface to form a rough surface sufficiently rough for powder coating,
   (b) powder coating said rough surface with an organic thermosetting resin powder to form a thermosetting organic powder film on said rough surface,
   (c) heating and curing said thermosetting organic powder film to a temperature sufficient to form a thermoset, fully cured organic coating on said rough surface of said backing plate for protecting said backing plate against corrosion,
   (d) applying an adhesive on said thermoset, fully cured organic coating and drying said adhesive to form an adhesive layer on said fully cured organic coating, and
   (e) applying said friction pad to said adhesive and heat molding said friction pad to said backing plate, whereby said friction pad is adhesively bonded to said fully cured organic coating which is itself bonded to said rough surface of said backing plate to form said friction member, whereby disturbance of said fully cured organic coating by said heat molding, is avoided.

2. The method of claim 1, wherein said organic thermosetting resin powder is selected from the group consisting of epoxy resin, phenol resin, melamine resin, acrylic resin, and modified phenolic resin.

3. The method of claim 1, wherein said adhesive layer and said fully cured organic coating are formed of substantially the same material.

4. The method of claim 1, wherein said heating of said thermosetting organic powder film is performed by heating said backing plate to a temperature of at least 180° C. prior to said powder coating, then applying said resin powder to said rough surface of said heated backing plate, and then maintaining said backing plate with its powder coating at said temperature of at least 180° C. for at least one hour to form said thermoset, fully cured organic coating.

5. The method of claim 1, wherein said heat molding is performed at a temperature of at least 160° C. to produce a heat molded product.

6. The method of claim 5, further comprising subjecting said heat molded product to a temperature of at least 200° C. for up to ten hours to finish said friction member.

* * * * *